Patented May 1, 1951

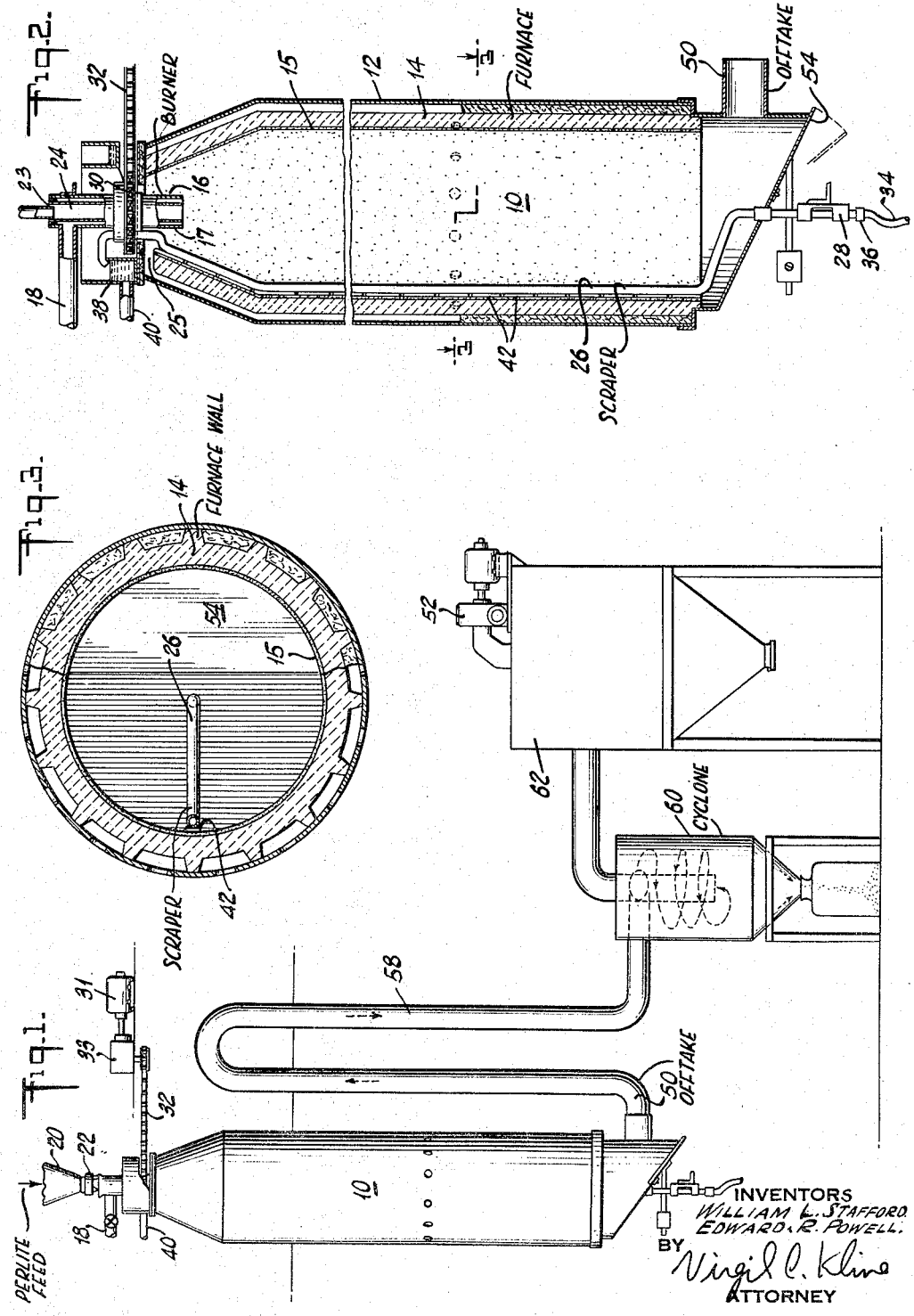

2,550,877

UNITED STATES PATENT OFFICE 2,550,877

METHOD OF HEAT EXPANDING PERLITE WHILE WIPING FURNACE INTERIORS

William L. Stafford, Somerville, and Edward R. Powell, North Plainfield, N. J., assignors to Johns-Manville Corporation, New York, N. Y., a corporation of New York Application May 13, 1948, Serial No. 26,747

10 Claims. (Cl. 252—378)

This invention is concerned with an improved method of heat expanding crude perlite and similar heat expandible minerals.

Crude or raw perlite is a volcanic glass of concentric onion-like structure which usually has a silica content of about 65–70% by weight, together with about 12–16% alumina, 2–5% entrapped water, 7–10% alkali metal oxides and small amounts of oxides of iron, calcium and magnesium. A characteristic property of perlite and of similar volcanic glasses containing upwards of 2% water, is that when such material is exposed in fine particle form to high temperatures in the range 1600–2100° F., softening and rapid expansion or puffing of the particles takes place to produce a cellular expanded product which may have an extremely low density. Because of its low density, chemical inertness and heat resistance, fully expanded perlite has considerable value as a heat insulating material.

A primary object of the present invention is to provide an improved method of heat expanding minerals such as perlite.

A more particular object is to provide a perlite expanding method which is relatively more economical and efficient as compared to methods heretofore practiced. The efficiency of any perlite expanding method is measured by the quality (low density and low thermal conductivity) of the product produced, the relative yield of expanded product based on the weight of expandible material in the crude, and the efficiency of heat utilization of the expanding method.

The present method follows prior practice insofar as crude or raw perlite in finely divided form is dispersed in air or gas suspension and is fed into a high temperature flame within a furnace combustion chamber. The flame temperature and rate of perlite feed are controlled to effect heat softening and rapid expansion or puffing of the softened perlite particles while they are in suspension in the combustion gases. The operation is conducted so as to effect rapid removal of the gas suspension of thus expanded perlite from the high temperature zone and cooling thereof to harden the expanded cellular product.

Whenever flash heat expansion of perlite takes place while the particles are suspended in a flowing stream of hot gas within a furnace, some of the expanded particles are thrown into contact with the wall lining of the furnace while in heat softened condition, and such particles tend to adhere to the lining and to build up thereon so long as the heat expanding operation proceeds. When the period of sojourn of freshly expanded perlite within a high temperature flash expanding zone is prolonged for any substantial period of time, the heat softened walls of the cells tend to fuse and coalesce to form on cooling a dense clinker which cannot be re-expanded, and which has little value as a heat insulating material.

A preferred operating feature of the present invention consists in carrying out the heat puffing or expanding operation within a chamber which is provided with a permanent or semi-permanent and continuously replenished inner wall lining of definite thickness consisting of low density heat expanded perlite. Such expanded perlite lining promotes more economical and efficient heating and higher yields of a high quality expanded perlite, as compared to a heat expanding operation carried out within a furnace chamber which is not so lined. The invention further contemplates use of a water cooled scraper or equivalent means for periodically wiping the inner face of the expanded perlite wall lining at a rate which is sufficient, in conjunction with the rate at which deposition of freshly expanded perlite takes place at the inner face of the lining, to preserve high insulating and heat reflecting properties of the lining and to limit build up of thickness thereof, to allow for continuous operation. The scraper operates to maintain an expanded perlite lining of definite thickness with a substantially smooth inner face, and to preserve the heat radiating and insulating properties of the lining by preventing fusion and clinkering and by removing fused and coalesced potentially clinkering material before such material has a chance to accumulate and consolidate to a dense clinker structure.

The method as heretofore outlined is best practiced in a furnace with either upward or downward vertical flow of the carrier gas stream of dispersed perlite particles therethrough. In order to develop high yields of a high quality product with minimum opportunity for contact of the heat softened and expanded cellular perlite particles with each other and with solid surfaces, there is some advantage in carrying out the heat expanding operation with vertically downward and substantially streamline non-turbulent flow of the gas dispersed particles throughout a vertical shaft furnace. This preferred operation makes it possible to avoid overexposure of softened expanded cellular particles to high temperatures and resulting degradation after the initial expansion has taken place.

Apparatus suitable for practice the present invention is disclosed in our joint U. S. Patent application S. N. #26,746 of even date, granted September 5, 1950, as U. S. Patent #2,521,190.

With the above and other objects and features in view, the invention consists in the improved method of heat expanding perlite which is hereinafter described and more particularly defined by the accompanying claims.

In the following description reference will be made to the accompanying drawings, in which:

Fig. 1 portrays in vertical elevation a preferred form of heat expanding furnace, with connecting cooling and separating equipment;

Fig. 2 is a somewhat enlarged portrayal of the furnace in vertical section; and

Fig. 3 is a view in horizontal section taken on the plane 3—3 of Fig. 2.

Referring to the drawings, the heat expanding furnace shown comprises a vertical shaft 10 provided with a cylindrical metal casing 12. The furnace is provided with a refractory insulation lining 14. The furnace is also shown with an inner face portion 15 of the refractory insulation lining which consists of heat expanded perlite deposited in situ thereon and built up to definite limited thickness during operation of the furnace.

Mounted in an opening at the top of the furnace is an annular gas or oil burner 16 which is supplied with a primary air-fuel mixture by a pipe 18. Burner 16 is provided with straight tubular walls 17 disposed in vertical position, with the central axis of the burner located concentrically with, or parallel to, the longitudinal axis of the furnace 10. For furnaces of large capacity several burners may be installed to avoid expansion turbulence.

Finely divided crushed raw perlite is introduced at a controlled rate from a hopper 20 through a valve 22 into a straight walled vertical feed pipe 24. Pipe 24 is mounted concentrically within the burner 16 and is ported out into the top of the furnace within the core of a combustion flame developed at the burner orifice. Secondary air for the burner may enter the furnace through an aperture 23 at the top entrance to the feed pipe 24, and through preheating passages and ports 25 in the furnace lining.

A rotary wall scraper 26 is provided to limit the thickness and preserve high heat radiating and insulating properties of the inner expanded perlite lining 15 for the furnace, to thereby insure continuous operation of the furnace on an efficient operating cycle. The scraper illustrated is a water cooled pipe which is mounted to rotate in a fixed path about the vertical axis of the furnace, and which is shaped to the contour of the furnace lining 14 throughout the length thereof. Scraper 26 is supported by bearings 28 at the base of the shaft and by a roller bearing mounted sprocket drive member 30 at the top of the shaft. The actuating means for sprocket 30 consists of a motor 31 and connecting drive chain or equivalent flexible drive means 32 whereby the sprocket may be rotated and thereby rotate the scraper to wipe the inner surface of lining 15 of the furnace throughout its full area at speeds which are readily controlled by a speed regulator 33. Cooling water for the scraper 26 is shown as delivered by a hose or pipe 34 through a stuffing box 36. Hot water is discharged from the bent over top of the scraper 26 into a water collecting ring 37, from which the water drains off through pipe 48. The wiping face of the scraper is shown as provided with wearing strips 42.

In the operation of the preferred method, crude perlite is preferably pulverized to particles which are finer than standard 20 mesh screen. Optimum particle sizes range between —65 and +200 mesh. Burner 16 is operated to develop flame temperatures in the upper portion of the furnace higher than 1700° F. Finely divided perlite is fed into the core of the flame developed by the burner, after initial suspension in secondary air aspirated through port openings 23. The rate of perlite feed is controlled to develop a relatively thin dispersion of the perlite particles as a suspension in the carrier gas stream of hot combustion gases which moves downwardly through the furnace from the burner ports. Rapid heat softening and puffing or expansion of individual perlite particles is normally completed within a period of 2–4 seconds after the crude perlite particle initially issues from the lower end of feed pipe 24.

The carrier gas stream of expanded perlite particles which is thus developed within the upper portion of the furnace moves downwardly therethrough at a rate which is preferably controlled to develop substantially streamline flow throughout the length of the furnace 10. The carrier gas stream changes its flow direction from a vertical to a horizontal path just prior to exit from the bottom of the furnace into an offtake pipe 50. The rate of gas removal from the furnace is under the control of a suction fan 52. Any unexpanded or incompletely expanded particles of heavier density than the fully expanded particles tend to be thrown out of the carrier gas as it changes direction, and are collected at the bottom of the shaft furnace. This heavier material can be removed by opening a hinged gate 54.

As the gas carrier stream of expanded perlite particles exits from the base of the furnace through pipe 50, it is rapidly cooled by radiation loss of heat. Pipe 50 is shown as including a cooling loop 58 of sufficient length to develop substantial cooling of the temperature of the carrier gas stream before it enters the top of a cyclone separator 60. A major proportion of the expanded perlite particles is thrown out of the carrier gas stream as it traverses the cyclone 60, and is collected at the base of the cone. Separation of finer expanded cellular perlite bubbles and bubble fragments takes place in a dust collector 62, prior to discharge of the carrier gas stream through fan 52.

By maintaining a lining 15 of cellular heat expanded perlite within the heating section of the shaft furnace 10 which is continually wiped by the scraper 26, it is possible to produce a cellular expanded perlite product of high quality and in high yield while operating on an efficient and economical continuous heating cycle. For example a yield of at least 88–90% of the expandible material charged to the furnace has been developed on a continuous operating cycle, with recovery of a cellular expanded product averaging 2–3 pounds per cubic foot density. This high yield of a high quality product is obtained while operating the furnace at a capacity as high as 300 pounds of finely divided perlite charged to the furnace for each 1½ sq. ft. of furnace cross section. When operating the furnace to develop optimum temperatures of about 2000–2100° F. in the heat expanding zone, the heat insulating and heat radiating properties of a cellular expanded perlite lining 15 of about ⅛–¼ inch thickness are such as to maintain temperatures within the heat expanding zone as much as 200–300° F. above those which can be developed with the same fuel consumption, without the presence of said expanded perlite lining.

Relatively higher yields of a high quality product are obtained when operating the furnace in the preferred manner with vertically downward streamline flow of the carrier gas stream of dispersed fine particles within the heat expansion zone. To develop substantially streamline flow, the flow velocity of the carrier gas stream and suspended particles is preferably limited to approximately 2-4 feet per second within the heat expanding zone. Also the rate of crude particle feed is preferably controlled to provide at least about 20 to 30 cubic feet of carrier combustion gas for each pound of crude perlite feed (at operating temperatures).

The finely divided crude perlite which is introduced to the heating zone should be of fairly uniformly fine particle size. The particle size of the charged material is an important factor for insuring that all charged material can be subjected to substantially uniform treatment within the heat softening and expansion temperature range during the short period of 2-4 seconds which measures the time of sojourn of each particle within the heat expansion zone.

By rotating scraper 26 in a fixed path which parallels and is spaced about ⅛-¼ inch from the inner face of refractory lining 14, opportunity is given for heat softened expanded perlite particles which are thrown into contact with the furnace lining to adhere and collect thereon up to a thickness for the inner perlite lining 15 which is permitted by the scraper. Even when operating with the preferred downward streamline flow of gas dispersed perlite particles through the heat softening and expansion zone of the furnace, approximately 10% of the heat softened perlite particles are thrown into contact with the inner face of the furnace lining 15, where they tend to cling and collect. The scraper should be rotated at speeds not substantially lower than 10 R. P. M., but is preferably operated at substantially higher speeds of say 90 R. P. M. A minimum linear speed for the scraper is about 50 feet per minute. The scraper operates to limit the thickness of the built up perlite lining 15 within definite dimensions, and to prevent coalescence of fused perlite or formation of dense clinkering material at the inner face of the lining. Since the scraper is water cooled, its periodic traverse of the inner lining 15 tends to lower the temperature of this face relative to the gas temperatures within the heat expanding zones of the furnace, and this cooling supplements the mechanical scraper action whereby optimum heat insulating and reflecting properties are preserved throughout the full area and thickness of the shell 15.

In suspending or starting up operation of the furnace, the scraper should be operated whenever the inner face of the expanded perlite lining 15 is at a temperature at or above the heat softening temperature of the perlite. In starting operation of the furnace, the burner 16 should be operated to slowly raise the furnace temperature to that suitable for flash heat expansion of perlite, and the initial rate of crude perlite feed to the burner should not substantially exceed half the maximum rate of feed until such time as the burner 16 is brought up to the capacity necessary to develop optimum temperatures for continuous heat expansion operation at maximum crude perlite feed rates.

When operating the furnace in accordance with the preferred method herein described, a yield of expanded perlite representing approximately 90% by weight of the crude material charged has been obtained of a product having a bulk density within the range 2-4 lbs. per cubic foot. Such product has a thermal conductivity or K factor of approximately 0.25 at 75° F. and 0.35 at 200° F., expressed as B. t. u. in./hr./sq. ft./F. deg. This product consists of a mixture of sealed bubble-like cells and cell clusters, together with a substantial fraction of broken cell or cell cluster fragments.

The invention which has been thus described by detailed example is not limited as to such details and it is to be understood that variations, changes and modifications are contemplated within the scope of the invention as defined by the following claims.

What we claim is:

1. In treating finely divided crude heat expandible volcanic glass by dispersing particles thereof in a hot carrier gas and moving said gas in heat transfer relation past a heat radiating surface composed of previously expanded volcanic glass while heat softening and expanding said gas suspended particles, the step comprising periodically wiping each unit area of said expanded volcanic glass surface at a rate which is effective to maintain a comparatively smooth stable surface having high heat radiating and insulating properties and to limit deposition and build up of expanded volcanic glass particles on said surface.

2. That method of heat treating a heat expandible mineral which comprises, dispersing the mineral in fine particle form within a carrier stream of hot combustion gases while moving said stream in a vertical direction substantially parallel to a heat radiating and insulating surface composed of previously expanded and lightly self-bonded mineral particles, heating the gas dispersed particles to a heat softening and expanding temperature, and stabilizing the heat insulation and radiating properties of said surface and preventing build up thereof by periodically wiping each unit area of the surface at a rate which is effective to dislodge excess expanded mineral including fused material tending to coalesce and form clinker.

3. The method of expanding finely divided heat expandible volcanic glass particles which comprises, feeding the particles in air dispersed suspension into a vertically directed combustion flame while directing said flame substantially parallel to a smooth confining surface faced with previously expanded volcanic glass particles, and periodically wiping each unit area of the surface at least once every six seconds at a speed which is effective for stabilizing the heat radiating and insulating properties of the surface and for preventing build up and clinker formation at the surface.

4. The method of expanding perlite which comprises, introducing finely divided crude perlite coaxially into a stream of highly heated gases while the gases are flowing vertically downward within an enclosing unobstructed heating space, rapidly heating and expanding said perlite particles by abstraction of heat from the hot gases while maintaining said expanded perlite particles in gas suspension in substantially streamline non-turbulent flow within and through the heating zone, and rapidly withdrawing and cooling the gas suspension of expanded perlite particles thus formed.

5. In producing expanded perlite by suspending finely divided crude perlite particles in a flowing stream of high temperature combustion gases in a heated wall enclosed chamber, the improvement which comprises, maintaining contiguous flow of the perlite particles and combustion gases longitudinally of the chamber, periodically scraping each unit area of said chamber wall while cooling the scraper, to prevent clinker formation, and rapidly cooling the gas dispersion of expanded particles leaving the discharge end of the heating chamber.

6. The method of expanding a heat expandible mineral which comprises, introducing finely divided crude mineral in gas dispersed particle form within a stream of hot combustion gases while the gases are flowing longitudinally of an enclosing, unobstructed heating space, rapidly heating and expanding said mineral particles by abstraction of heat from the hot gases and by absorption of heat reflected as radiant heat by a surface of freshly deposited expanded mineral surrounding said space, periodically wiping said surface throughout its area to maintain a comparatively smooth surface and to displace heat fused material and maintain a space of uniform cross section, cooling the wiper by circulating water therethrough, and rapidly withdrawing and cooling the gas suspension of expanded mineral particles thus formed.

7. The method of expanding finely divided crude perlite particles which consists of dispersing the particles into a vertically directed flame within a vertical heating space, effecting rapid heating and expansion of said particles by direct heat abstraction from the flame and by absorption of heat reflected as radiant heat from a surface of freshly deposited expanded perlite enclosing said flame, periodically wiping said surface throughout its area at a frequency of 1–9 wipes every six seconds to maintain a comparatively smooth surface and to displace heat fused material and maintain a space of uniform cross section, and rapidly withdrawing and cooling the gas suspension of expanded perlite particles thus formed.

8. The method of heat expanding perlite which comprises, introducing crude perlite particles within a combustion flame and moving combustion gas dispersed particles through a vertical combustion chamber, rapidly heating the flame and gas dispersed particles to expanding temperatures, rapidly cooling the heat expanded particles, and periodically wiping the wall lining of the chamber throughout the length of the heating zone by moving a cooling scraper thereover in a direction tangential to the flowing gas stream.

9. The method of treating a heat expandible mineral to produce a cellular low density product which comprises, dispersing such mineral in fine particle form in a flowing stream of high temperature combustion gases in a heated wall enclosed chamber, rapidly heating and expanding said mineral particles while carried in suspension in the hot gases, and periodically scraping each unit area of the chamber wall surface on which such expanded particles tend to accumulate to dislodge excess particles and prevent build up thereof on the wall surface.

10. The method of treating a heat expandible mineral to produce a cellular low density product which comprises, introducing such mineral in fine particle form into a heated wall enclosed chamber while heating said chamber by high temperature combustion gases, rapidly heating and expanding said mineral particles while advancing them through the chamber in direct contact with the hot gases, and periodically scraping each unit area of the chamber wall surface on which such expanded particles tend to accumulate to dislodge such particles and prevent buildup thereof on the wall surface.

WILLIAM L. STAFFORD.
EDWARD R. POWELL.

REFERENCES CITED

The following references are of record in the file of this patent:

UNITED STATES PATENTS

| Number | Name | Date |
|---|---|---|
| 2,044,680 | Gilbert | June 16, 1936 |
| 2,431,884 | Neuschotz | Dec. 2, 1947 |

OTHER REFERENCES

"Perlite, Source of Synthetic Pumice," Bureau of Mines IC 7364, pages 2 and 3, August 1946.

King, "Pumice and Perlite as Industrial Materials in California," published on pages 293–319 of Calif. Journal of Mines and Geology, vol. 44, No. 3, July 1948.